United States Patent [19]
Küttner et al.

[11] Patent Number: 5,107,700
[45] Date of Patent: Apr. 28, 1992

[54] ARRANGEMENT FOR DETECTING THE BEGINNING OF INJECTION IN A DIESEL INTERNAL-COMBUSTION ENGINE

[75] Inventors: Thomas Küttner; Rolf Stünkel, both of Stuttgart; Wolf Wessel, Oberriexingen, all of Fed. Rep. of Germany

[73] Assignee: Robert Bosch GmbH, Stuttgart, Fed. Rep. of Germany

[21] Appl. No.: 503,148

[22] Filed: Mar. 30, 1990

Related U.S. Application Data

[63] Continuation of Ser. No. 290,260, filed as PCT/DE87/00115, Mar. 19, 1987, abandoned.

[30] Foreign Application Priority Data

Apr. 16, 1986 [DE] Fed. Rep. of Germany ....... 3612808

[51] Int. Cl.$^5$ ............................................. G01M 15/00
[52] U.S. Cl. .................................................. 73/119 A
[58] Field of Search ...................... 73/119 A; 123/494; 239/71, 533.2, 533.3, 533.4

[56] References Cited

U.S. PATENT DOCUMENTS

| | | | |
|---|---|---|---|
| 4,185,494 | 1/1980 | Yelke | 73/119 A |
| 4,680,667 | 7/1987 | Petrie | 123/490 |
| 4,714,998 | 12/1987 | Bussey et al. | 364/431.01 |

Primary Examiner—Robert Raevis
Attorney, Agent, or Firm—Michael J. Striker

[57] ABSTRACT

An arrangement for and a method of detecting a beginning of injection in an internal combustion engine wherein an injection pressure is sensed by a pressure transducer and a pressure signal generated thereby is compared with a threshold pressure signal which is formed from a peak value of the injection pressure signal of the preceding injection period, and an injection signal is generated when the injection pressure exceeds the threshold pressure.

7 Claims, 1 Drawing Sheet

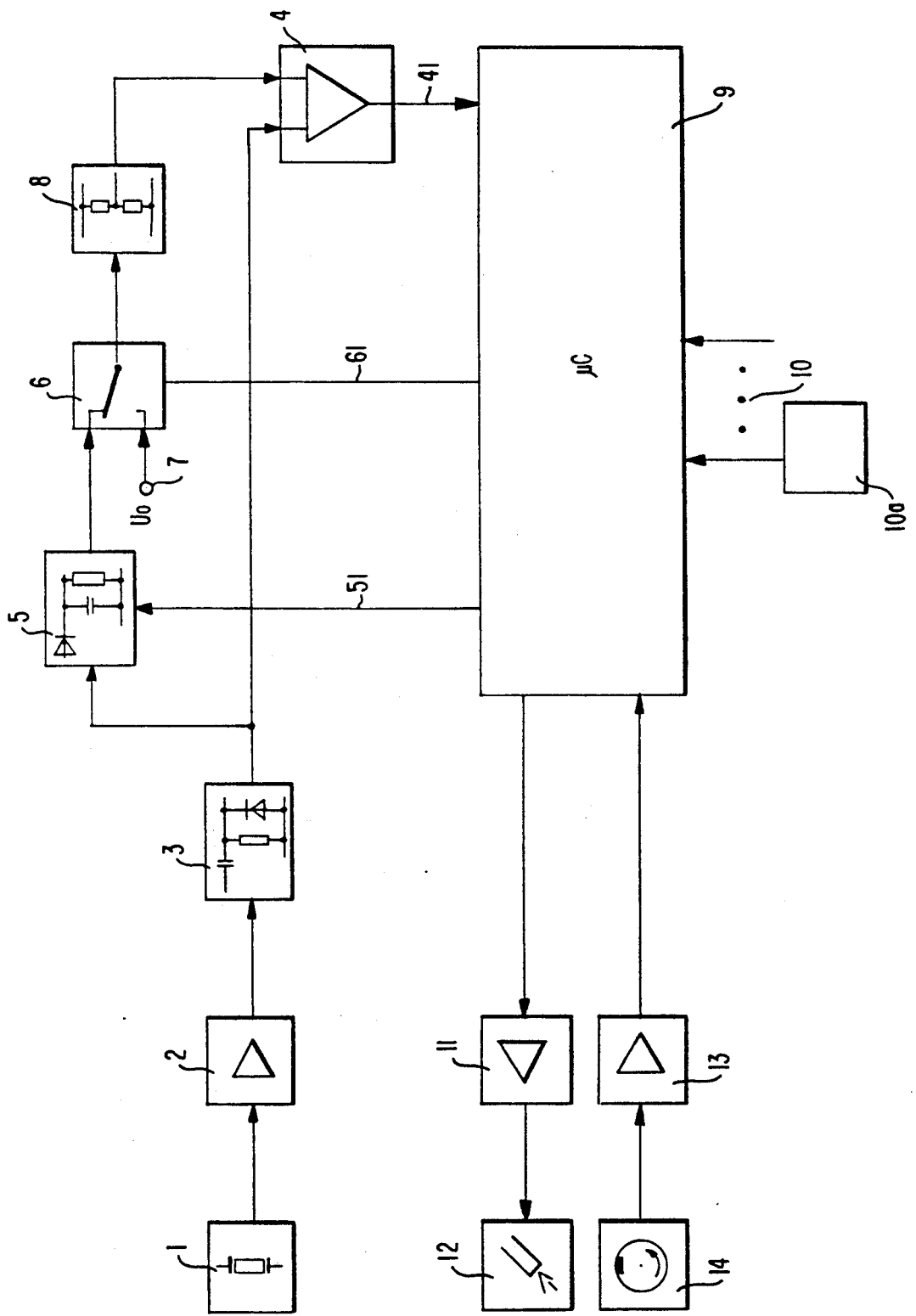

ARRANGEMENT FOR DETECTING THE BEGINNING OF INJECTION IN A DIESEL INTERNAL-COMBUSTION ENGINE

This application is a continuation of application Ser. No. 290,260, filed as PCT/DE87/00115, Mar. 19, 1987, now abandoned.

BACKGROUND OF THE INVENTION

The invention relates to an arrangement for detecting a beginning of injection in a diesel internal-combustion engine.

Such an arrangement is already known from German Offenlegungsschrift 2,231,165. In it, an electric signal corresponding to the pressure in an injection line of a diesel internal-combustion engine is used to obtain a trigger signal for a stroboscope lamp. The signal is passed via a clamp circuit, for zeroing, to a trigger with fixed lower operating point, the output signal of which passes via a differential element for triggering of the stroboscope lamp. Furthermore, between the trigger and the differential element are connected a gate circuit and a monostable flip-flop, which actuates the gate circuit speed-dependently. Consequently, a multiple triggering of the stroboscope lamp, which could be caused by compressive oscillations is avoided.

Furthermore, a measuring device for determination of a dynamic beginning of feeding of diesel engines is known from the publication MTZ 1964, volume 7, page 292 et seq. Here too, the measuring device preferably serves for the triggering of a stroboscope lamp. The pressure detected in an injection line of the diesel internal-combustion engine is converted by a magnetostrictive transducer into a corresponding electric pressure signal, which is first differentiated and then passed to a switching stage, a output signal of which represents a trigger signal for the stroboscope lamp. To prevent multiple triggering of the stroboscope lamp, connected upstream of the switching stage is a gate stage, which actuates a gate stage (sic) by a monostable flip-flop.

However, such arrangements for detecting a beginning of injection are also used in injection controls for diesel internal-combustion engines, such as are known for example from U.S. Pat. No. 4,265,200. Such injection controls require the actual beginning of injection as actual parameter. Frequently, so-called pintle stroke transducers are used for this, which detect the movement of the pintle of the injection nozzle and thus the actual beginning of injection. As a result, the injection nozzle is of course made more complicated in design and thus more expensive, at the same time the space required for the injection nozzle becomes greater, since the pintle stroke transducer has to find space in the injection valve housing, together with its electrical connections. Because of these drawbacks, it is sometimes necessary to dispense with a pintle stroke transducer.

SUMMARY OF THE INVENTION

The object of the present invention is an arrangement for detecting a beginning of injection in a diesel internal-combustion engine which eliminates a need in a pintle stroke transducer and is suitable in particular for an injection control.

An object is achieved by the arrangement in which an output pressure signal of a pressure transducer located at the output of a pressure pump is compared with a pressure threshold signal which is formed from a peak value of the output pressure signal of a preceding injection period, and an injection signal is generated when the output pressure signal exceeds the threshold signal.

The arrangement according to the invention for detecting a beginning of injection in a diesel internal-combustion engine has the particular advantage that it makes possible, in a particularly simple way, an automatic adaption of a pressure threshold signal to a variable signal level of a pressure signal. Therefore, a constant security against erroneous detections of a beginning of injection is achieved over broad operating ranges of the diesel internal-combustion engine. This is advantageous in particular in the case of high-speed diesel internal-combustion engines, which may have considerable compressive oscillations in the injection lines.

The arrangement is influenced in a particularly simple manner by operating parameters of the diesel internal-combustion engine, which can be used, in particular, during deceleration or at high speeds to avoid erroneous detections of a beginning of injection. Furthermore, a particularly simple measure is, once an injection signal has failed to appear, to set a pressure threshold signal to a fixed lower value in order to detect particularly reliably the next beginning of injection. If, however, during deceleration, several injection signals fail to appear successively, the arrangement allows an extraction of the first injection signal occurring to be carried out in a particularly simple way. Consequently, an erroneous detection of the beginning of injection, which may be caused by a volume filling and a pressure build-up within the elastic diesel fuel is avoided.

BRIEF DESCRIPTION OF THE DRAWING

The invention as to its construction so to its method of operation, together with additional objects and advantages thereof, will be best understood from the following description thereof with the reference to the accompanying drawing wherein the single FIGURE represents a simplified block circuit diagram of the preferred embodiment of an arrangement according to the present invention.

DETAILED DESCRIPTION OF THE PREFERRED EMBODIMENT

In the drawing, a pressure transducer 1 is shown, an output signal of which passes to a buffer amplifier 2. Connected downstream of the latter is a clamping circuit 3, an output of which in turn leads to the positive input of a comparator 4 and the input of a peak detector 5. The output of the peak detector 5 is connected to a first contact of a switch 6 the second contact of which is connected to a terminal 7. The switching contact of the switch 6 leads to a voltage divider 8, the output of which is in turn connected to the negative input of the comparator 4. The output of the comparator 4 leads to a microcomputer 9, acting as control device of the arrangement, which has further inputs 10. The microcomputer 9 controls an injection system 12 via a driver stage 11, while at the same time it receives signals from a speed transducer 14 via an evaluation stage 13. Furthermore, a connecting line from the comparator 4 to the microcomputer 9 is designated in the drawing by 41, a connecting line from the microcomputer 9 to the peak detector 5 is denoted by 51, and a line from the microcomputer 9 to the switch 6 is denoted by 61.

The block circuit diagram illustrated in the drawing represents a system for an electronic injection control for a diesel internal-combustion engine. To be precise, both the required injection quantity and the injection instant are set by the microcomputer 9 via the driver stage 11 for the injection system 12. For this, the microcomputer 9 receives from respective sensors, such, i.e., a load sensor 10a, via the inputs 10, information on current operating parameters of the diesel internal-combustion engine, such as, in particular, temperature, load condition and accelerator pedal position. Furthermore, the microcomputer 9 receives, via the speed transducer 14 and the evaluation stage 13, information on the speed and the current crankshaft angle. Many such electronic controls for diesel internal-combustion engines are known from the prior art and, to simplify presentation, are consequently not explained any further here.

Since the injection system 12 does not give the microcomputer 9 any information on a beginning of injection, the beginning of injection is determined indirectly via an output pressure of the injection pump. For this, the piezoceramic pressure transducer 1 is provided, which supplies a pressure-proportional voltage signal (pressure signal) to the high-resistance input of the buffer amplifier 2. The electronic clamping circuit 3, connected downstream of the buffer amplifier 2, takes care, in a known way, that there is an unambiguous zero position of the pressure signal.

Furthermore, as a result, production tolerances, temperature drifts and any inaccurate adjustment of pressure transducer 1 and buffer amplifier 2 are rendered ineffective in a particularly advantageous way. During the zero point clamping by the clamping circuit 3, interfering effects from the pressure transducer 1 and from the supply lines are substantially dampened.

The peak detector 5 receives from the clamping circuit 3 the periodic pressure signal with the injection sequence of the diesel internal-combustion engine, and stores the peak level of said signal in a known way. In normal operation, the switch 6 is switched in such a way that the output of the peak detector 5 passes directly into the voltage divider 8. The voltage divider 8 divides the peak level obtained from the peak detector 5 down to a fraction and gives this value to the negative input of the comparator 4. Since the positive input of the comparator 4 is directly connected to the output of the clamping circuit 3, a positive signal edge appears at its output at the precise moment that the output signal of the clamping circuit 3 reaches precisely the fraction of the peak level of the preceding pressure signal.

The line 41 leads from the comparator 4 to an interrupt input of the microcomputer 9. On appearance of a positive signal at the output of the comparator 4, the microcomputer 9 therefore interrupts its running program and executes an interrupt routine. The microcomputer 9 contains an internal counter which, on appearance of a reference mark on the speed transducer 14 and of a corresponding signal at the output of the evaluation stage 13, is reset and newly started each time. The counter reading reached at the end is inversely proportional to the speed of the diesel internal-combustion engine. The counter therefore represents, so to speak, the "clock" of the arrangement. The interrupt routine initiated by the comparator 4 then reads the counter immediately after the interrupt routine has been initiated and stores the value read as a time measure for the beginning of injection. Furthermore, the peak detector 5 is cleared for the following injection period via the line 51.

If no pulse appears at the output of the comparator 4 within a reading period of the counter, i.e. during one revolution of the transducer wheel on the speed transducer 14, the microcomputer 9 switches over the switch 6 for the following period, via the line 61, so that a voltage at the terminal 7 which is lower than a predetermined magnitude of the peak value of the pressure signal passes via the voltage divider 8 to the negative input of the comparator 4. As a result, a reliable recognition of the beginning of delivery is ensured if the diesel internal-combustion engine is in the transition from load operation to deceleration.

If no pulse appears at the output of the comparator 4 during several successive reading periods of the counter, the microcomputer 9 recognizes continuous deceleration of the diesel internal-combustion engine and accordingly drives the functions of the injection system 12, provided for this, in a known way until deceleration is stopped. The counter itself, however, continues to function as the crankshaft continues to rotate due to engine braking.

At the end of deceleration, i.e. when the accelerator pedal is operated again, the first pulse supplied by the comparator 4 is not used for evaluation of the beginning of injection. Consequently, an incorrect evaluation is prevented, which could be caused by the necessary volume filling and the pressure build-up in the diesel fuel after deceleration.

While the invention has been illustrated and described as embodied in an arrangement for detecting a beginning of injection in a diesel internal-combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement for detecting a beginning of injection in a diesel internal combustion engine, said arrangement comprising
    a transducer for detecting an injection pressure of the diesel internal combustion engine and for generating a pressure signal;
    means for determining the peak value of the pressure signal;
    means for generating a fixed voltage signal having a magnitude which is lower than a predetermined magnitude of the peak value of the pressure signal;
    means for sensing an operating parameter of the diesel internal combustion engine;
    means for generating a pressure threshold signal from one of a fraction of the peak value of the pressure signal and a fraction of the fixed voltage signal in dependence on the operating parameter; and
    means for generating an injection signal in response to a following pressure signal exceeding the pressure threshold signal.

2. An arrangement as set forth in claim 1, wherein said sensing means comprises a sensor for sensing a load of the diesel engine combustion engine as the operating parameter.

3. An arrangement as set forth in claim 2, further comprising means for causing said pressure threshold signal generating means to generate a pressure threshold signal from a fraction of the fixed voltage signal when said injection signal generating means fails to generate the injection signal.

4. A method of detecting a beginning of injection in a diesel internal combustion engine, said method comprising the steps of:
  detecting an injection pressure of the diesel internal combustion engine and generating a pressure signal in response thereto;
  determining a peak value of the pressure signal;
  generating a fixed voltage signal having a magnitude which is lower than a predetermined magnitude of the peak value of the pressure signal;
  sensing an operating parameter of the diesel internal combustion engine;
  generating a threshold pressure signal from one of a fraction of the peak value of the pressure signal and a fraction of the fixed voltage signal dependent on the operating parameter; and
  generating an injection signal in response to a following pressure signal exceeding the pressure threshold signal.

5. A method according to claim 4, wherein said sensing step comprises sensing of a load of the diesel internal combustion engine as the operating parameter.

6. A method according to claim 4, further said pressure threshold signal generating step includes generating a threshold pressure signal from a fraction of the fixed voltage signal when the following pressure signal has a value which is below the pressure threshold signal.

7. A method according to claim 4, further comprising the steps of:
  determining a deceleration of the diesel internal combustion engine; and
  filtering off a first injection signal generated after the deceleration.

* * * * *